United States Patent [19]

Goto

[11] 4,044,366
[45] Aug. 23, 1977

[54] DEVICE FOR APPLYING PRESSURE TO DEVELOPER DISTRIBUTING MEANS IN SELF-DEVELOPMENT TYPE CAMERAS

[75] Inventor: Toshio Goto, Omiya, Japan

[73] Assignee: Fuji Photo Optical Co., Ltd., Omiya, Japan

[21] Appl. No.: 519,029

[22] Filed: Oct. 29, 1974

[30] Foreign Application Priority Data

Nov. 6, 1973 Japan .................. 48-124812

[51] Int. Cl.² .................. G03B 17/50; G03D 9/02
[52] U.S. Cl. .................. 354/86; 354/304
[58] Field of Search .................. 354/83, 84, 85, 86, 354/88, 304, 301, 303, 312

[56] References Cited

U.S. PATENT DOCUMENTS

| 2,638,828 | 5/1953 | Bachelder et al. | 354/304 X |
|---|---|---|---|
| 2,873,659 | 2/1959 | Bing et al. | 354/87 |
| 3,142,243 | 7/1964 | Land | 354/303 |
| 3,264,962 | 8/1966 | Dieffenbach | 354/301 |
| 3,369,473 | 2/1968 | Bartlett | 354/304 |
| 3,561,340 | 2/1971 | Erlichman | 354/304 |
| 3,641,908 | 2/1972 | Eloranta | 354/304 |
| 3,776,118 | 12/1973 | Driscoll et al. | 354/304 |

FOREIGN PATENT DOCUMENTS

| 379,960 | 4/1940 | Italy | 354/83 |
|---|---|---|---|
| 934,675 | 8/1963 | United Kingdom | 354/85 |

*Primary Examiner*—Fred L. Braun
*Attorney, Agent, or Firm*—Harold L. Stults

[57] ABSTRACT

A device for applying pressure to a pair of developer distributing rollers in a self-development type photographic camera utilizes a pair of bell crank levers provided in the vicinity of the ends of the rollers for pressing one roller onto the other. The ends of the shaft of the roller which is movable in the direction to change the pressure between the pair of rollers are each engaged with one of the bell crank levers. A spring or springs are engaged with the bell crank levers to urge the bell crank levers in the direction to press one roller onto the other. The pressure between the rollers is changed by changing the tension of the spring or springs.

7 Claims, 8 Drawing Figures

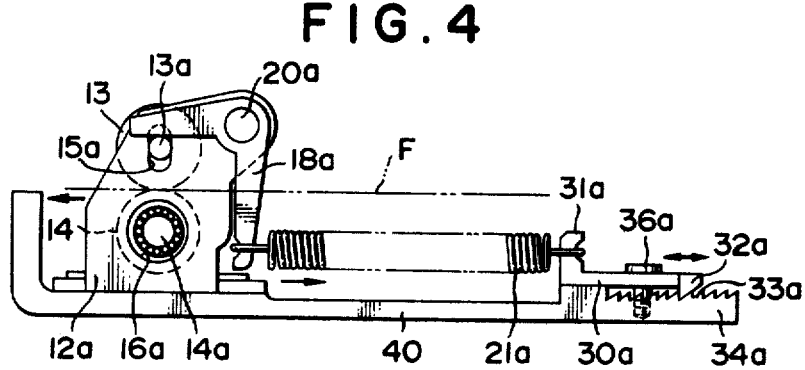
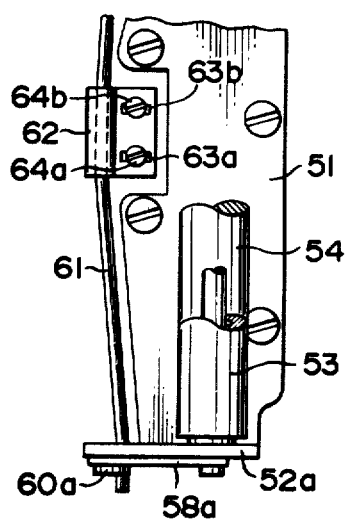
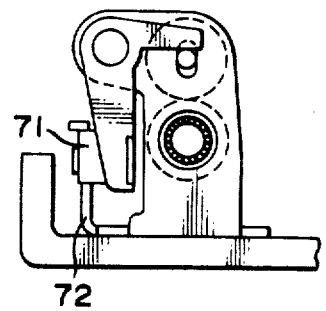
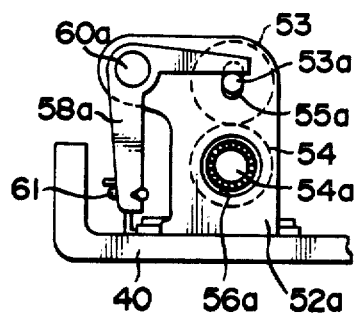
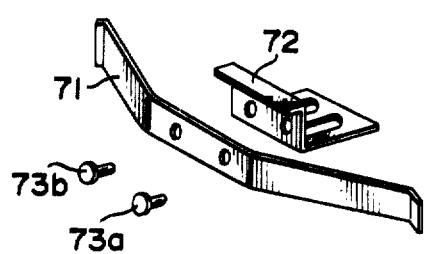

DEVICE FOR APPLYING PRESSURE TO DEVELOPER DISTRIBUTING MEANS IN SELF-DEVELOPMENT TYPE CAMERAS

BACKGROUND OF THE INVENTION

1. Field of the Invention

This invention relates generally to a device for distributing a developer over the surface of the photosensitive film of a film unit in a self-development type photographic camera, and more particularly to a pressure applying device for giving force to a pair of pressure applying rollers which are adapted to apply compressive pressure to the film unit as it is advanced therebetween for distributing the developer liquid over the surface of the exposed photosensitive film.

2. Description of the Prior Art

In the conventional self-development type photographic cameras, a film unit comprising a photosensitive film, a transfer sheet superposed thereon and a rupturable pod attached to one end of the film is advanced between a pair of pressure applying rollers so that the pod is ruptured by the compressive pressure applied thereto and the developer liquid contained therein is uniformly distributed over the surface of the photosensitive film. The uniform distribution of the developer liquid, initiates the diffusion transfer process and a photographic image is obtained on the transfer sheet. Therefore, the quality of the image obtained on the transfer sheet depends upon the uniformity of distribution of the developer liquid between the photosensitive film and the transfer sheet. In order to improve the uniformity of distribution of the developer liquid on the film, various devices have been proposed in conventional cameras for uniformly applying pressure to the pair of pressure rollers.

One of the conventional means for giving pressure to the pair of rollers comprises a pair of U-shaped springs provided at the opposite ends of the rollers for giving compressive force to the pair of rollers. This type of pressure applying means is advantageous in that the rollers can be removed from the camera and can accordingly be conveniently washed.

Another example of a conventional means for giving pressure to the pair of rollers comprises a twisted spring made of piano wire or the like extending in the direction of the pressure applying rollers and working at both ends thereof to press the shaft of one roller toward the other. This type of pressure applying means is also advantageous in that the rollers can be easily removed from the camera.

Since little space exists in the camera in the direction of the pressure application to the rollers, i.e. the direction normal to the plane in which the film unit advances, the pressure applying spring or springs of conventional pressure application means have a complicated shape and accordingly are difficult to manufacture. When such springs are mass-produced, there result small variations in the characteristics and shape of the springs which cause slight but critical differences in the pressure of the springs when used in the pressure application means. Further, the conventional springs of this type are disadvantageous in that it is very difficult to finely control the pressure thereof once they are mounted to the camera.

SUMMARY OF THE INVENTION

In the light of the foregoing observations and description of the conventional means for applying pressure to the pair of rollers which are adapted to apply compressive pressure to the film unit in a self-development type camera, the object of the present invention is to provide a pressure applying device for giving force to a pair of pressure applying rollers which can easily be manufactured.

Another object of the present invention is to provide a pressure applying device for giving force to a pair of pressure applying rollers in which the pressure of springs can easily be finely controlled.

Still another object of the present invention is to provide a pressure applying device for giving force to a pair of pressure applying rollers in which the shape of springs used for giving force to the rollers is considerably simplified by making the direction of extension of the spring parallel to the plane in which the film unit advances.

The pressure applying device in accordance with the present invention comprises a pair of bell crank levers provided in the vicinity of the opposite ends of pressure applying rollers or the like, one end of each bell crank lever being engaged with an opposite end of one of the two rollers, and a spring or springs being engaged with the other end of each bell crank lever to urge the bell crank levers in the direction to urge said one roller toward the other to produce compressive pressure between the pair of rollers. Since the springs extend in a plane parallel to the film, the shape of the springs can be simplified and the fine control of the pressure of the springs can be facilitated.

In one embodiment of the invention, the springs engaged with the ends of the bell crank levers are tension springs extending perpendicular to the rollers in the direction of film feed. In another embodiment of the invention, the spring is a simple bow-shaped spring extending along rollers.

BRIEF DESCRIPTION OF THE DRAWING

FIG. 4 is a side view showing the pressure applying device as shown in FIG. 2, FIG. 5 is a partial plan view showing another embodiment of the pressure applying device in accordance with the present invention, FIG. 6 is a side view showing the pressure applying device as shown in FIG. 5, FIG. 7 is a side view showing still another embodiment of the pressure applying device in accordance with the present invention, and FIG. 8 is a perspective view of a spring element employed in the embodiment shown in FIG. 7.

PREFERRED EMBODIMENTS OF THE INVENTION

Figure 1:
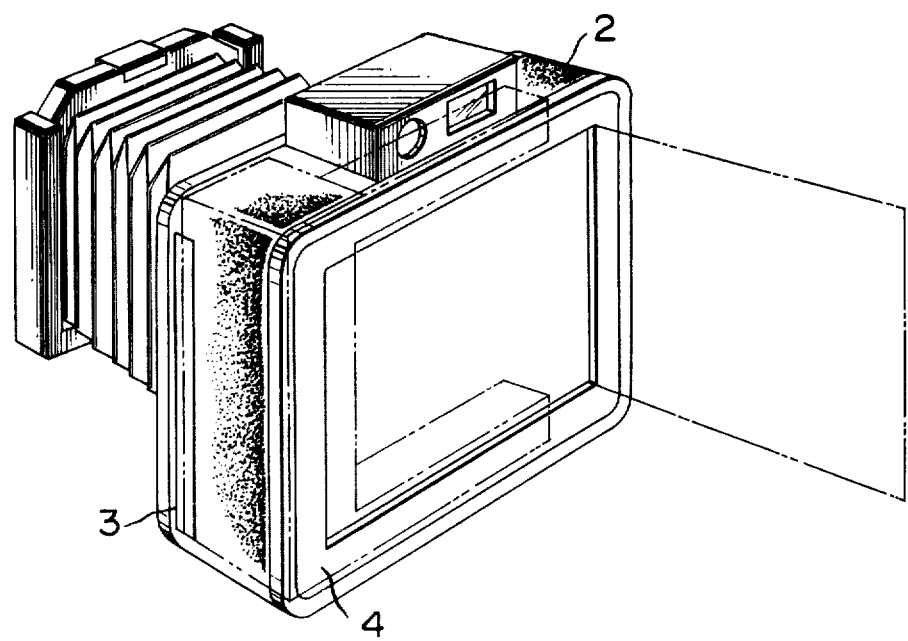
FIG. 1 is a perspective view showing a selfdevelopment type camera and a film cassette to be loaded therein.
Figure 1:
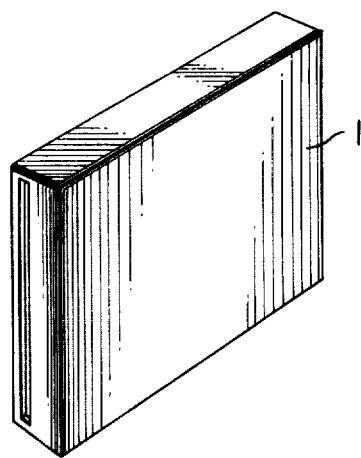

Referring to FIG. 1 which shows the appearance of a self-development type camera and a film cassette to be loaded therein in which the pressure applying device in accordance with the present invention is employed, the film cassette 1 carrying a photosensitive sheet and a transfer sheet is put into the camera body 2 and the photosensitive sheet is superposed with the transfer sheet after exposure and sent out of the camera body 2 through a slot 3 together with the transfer sheet. A development processing portion 4 is provided in the vicinity of the slot 3 and a developer liquid is distributed between the photosensitive sheet and the transfer sheet when the photosensitive sheet and the transfer sheet advance therethrough. The film unit comprising the photosensitive sheet and the transfer sheet may be of the type wherein the two sheets are superposed in the unit in advance and exposed, developed and fixed together.

Figure 2:
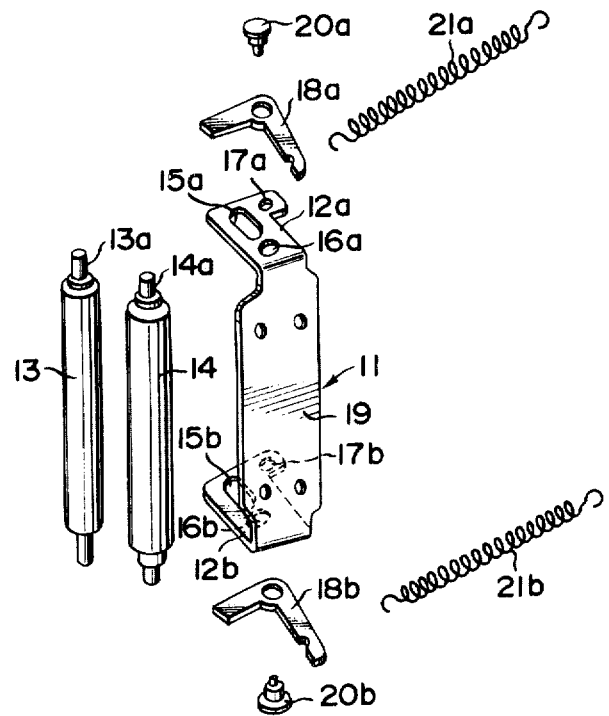
FIG. 2 is an exploded perspective view showing an embodiment of the pressure applying device in accordance with the present invention.

The elements constituting the pressure applying device to be used in the development processing portion 4 in the camera in accordance with the present invention are illustrated in FIG. 2. A holder 11 which has a pair of bent portions 12a and 12b at the opposite ends thereof is provided in the camera to hold a pair of press rollers 13 and 14. The bent portions 12a and 12b are provided with elongated guide holes 15a and 15b for guiding the upper roller 13 and support holes 16a and 16b for rotatably supporting the lower roller 14, respectively, as shown in FIG. 2. The bent portions 12a and 12b are further provided with pivot holes 17a and 17b for pivotally supporting bell crank levers 18a and 18b. The intermediate portion 19 of the holder 11 is provided with holes for fixing the holder 11 to a part of the camera body by proper fixing means such as screws. The rollers 13 and 14 have shafts 13a and 14a, respectively, to be engaged with said holes 15a, 15b, 16a and 16b. The bell crank levers 18a and 18b are pivotally mounted to the bent portions 12a and 12b of the holder 11 by means of pins 20a and 20b. A pair of tension springs 21a and 21b are engaged with one arm of the bell crank levers 18a and 18b to urge the levers 18a and 18b in one direction. The other arm of the bell crank levers 18a and 18b is engaged with the shaft 13a of the upper roller 13. Accordingly, by the tension of the tension springs 21a and 21b, the bell crank levers 18a and 18b are urged to press the upper roller 13 toward the lower roller 14.

Figure 3:
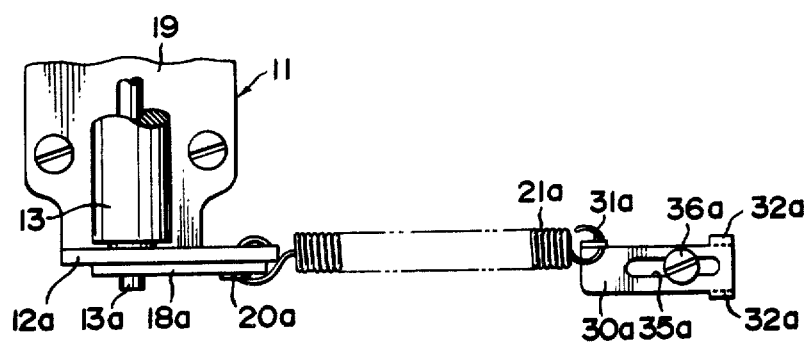
FIG. 3 is a partial plan view showing the pressure applying device as shown in FIG. 2.

The assembled state of the pressure applying device in accordance with one embodiment of the invention as described above with reference to FIG. 2 is illustrated in FIGS. 3 and 4. Referring to FIGS. 3 and 4 which show only one side of the device, the tension spring 21a is engaged with a projection 31a of a tension control member 30a. The tension control member 30a is provided with a pair of hooks 32a engaged with a tooth 33a (FIG. 4) of a serrated plate 34a which is integrally fixed to a base frame 40 in the camera body. The tension control member 30a is provided with an elongated hole or slot 35a extending in the direction of the tension spring 21a and a set pin 36a screwed to the serrated plate 34a is engaged with the slot 35a so that the position of the tension control member 30a may be changed by unscrewing the set pin 36a and moving the member 30a in the direction of the spring 21a and set in the position by screwing the set pin 36a.

As will be readily understood, the tension control means comprising the tension control member and so forth is also provided on the other end of the rollers in engagement with the other tension spring 21b.

In the embodiment as described above, it will be noted that the rollers 13 and 14 may be replaced by other pressure applying means such as pressure plates well known in the art.

In the operation of the above described pressure applying device, the tension of the springs 21a and 21b is properly controlled by selecting the position of the tension control members on the serrated plates. Thus, the bell crank levers 18a and 18b are urged to press the upper roller 13 onto the lower roller 14 to produce a proper compressive force between the two rollers 13 and 14. Therefore, the exposed photosensitive sheet and the transfer sheet of a film unit 1 fed between the rollers 13 and 14 is subject to a proper compressive force to uniformly distribute the developer liquid between the photosensitive sheet and the transfer sheet. Since the tension springs 21a and 21b are provided to extend in the direction of the film feed, the size of the springs can be made comparatively large.

Another example of the present invention is shown in FIGS. 5 and 6. In this embodiment, the tension springs 21a and 21b employed in the above embodiment are replaced by a simple bow-shaped spring 61. The bow-shaped spring 61 is supported at the intermediate portion thereof by a control member 62 slidably mounted to the camera body. The control member 62 is provided with two parallel slots 63a and 63b and is slidably mounted to the camera body by means of two position control screws 64a and 64b engaged with the slots 63a and 63b. The roller holder 51 having bent portions 52a and 52b at the opposite ends thereof is quite similar to the holder 11 shown in of the first embodiment as shown in FIGS. 2 to 4 and fixed to the base frame 40 in the camera as shown in FIG. 6. The shafts 53a and 54a of two rollers 53 and 54 are supported in the slots 55a and holes 56a of the bent portions 52a. Bell crank levers 58a are pivotally mounted to the bent portions 52a by means of a pivot pins 60a. The bow-shaped spring 61 extends along the rollers 53 and 54 and the opposite ends thereof are engaged with the bell crank levers 58a as shown in FIGS. 5 and 6 to urge the bell crank levers 58a in the direction to press the shaft 53a of the upper roller 53 downward. Similarly to the foregoing embodiment, the force of the spring 61 is controlled by controlling the position of the control member 62 by sliding the member 62 in the direction of the slots 63a and 63b unscrewing the screws 64a and 64b.

In accordance with this embodiment, the structure of the spring to urge the crank levers is simplified and uses only one spring member.

Still another embodiment of the pressure applying means in accordance with the present invention is illustrated in FIG. 7. In this embodiment, said simple bow-shaped spring 61 is replaced by a bow-shaped spring plate 71 as shown in FIG. 8. The bow-shaped spring plate 61 is mounted at the intermediate part thereof to a position control member 72 which is similar to the control member 62 as shown in FIGS. 5 and 6. As clearly shown in FIG. 8, the spring plate 71 is mounted to the control member 72 by means of screws 73a and 73b. The operation of the spring plate 71 is quite the same as that of said spring 61 employed in the above embodiment, and accordingly, the detailed description thereof is omitted here.

I claim:

1. In a photographic camera including a pair of pressure-applying members having opposite ends and forming a nip between which a film unit including a photosensitive sheet is fed to spread a developer thereon, a pressure-applying device for urging one of said pressure-applying members towards the other comprising, in combination a pair of bell crank levers pivotally mounted in said camera respectively adjacent said opposite ends of said pressure-applying members for swinging movement about an axis extending parallel to said nip, one arm of each of said bell crank levers being engaged respectively with said opposite ends of one of said pressure-applying members, a pair of tension springs each of which is engaged in tension with the other arm of a respective one of said bell crank levers for urging the bell crank levers in the direction to press said one of said pressure-applying members toward the other pressure-applying member, spring-force control means for controlling the force of the springs exerted on the bell crank levers by controlling the tension of said tension springs, said spring-force control means comprising a pair of tension control members mounted in said camera and respectively engaged with one end of said pair of tension springs each of said tension control members including a fixed toothed member having a row of teeth arranged in a lengthwise direction and a movable member having a projection which is engaged with said one end of the respective one of said tension springs and a hook selectively engaged with a tooth of its associated toothed member.

2. The construction as described in claim 1 wherein the arms of each of the bell crank levers are at an angle of the order of 90° from each other.

3. The construction as described in claim 1 wherein each of said pressure-applying members is a roller.

4. The construction as described in claim 1 wherein each of said tension springs is a coil spring.

5. In a photographic camera including a pair of pressure-applying members having opposite ends and forming a nip between which a film unit including a photosensitive sheet is fed to spread a developer thereon, a pressure-applying device for urging one of said pressure-applying members toward the other comprising, in combination, a pair of bell crank levers pivotally mounted in said camera respectively adjacent said opposite ends of said pressure-applying members for swinging movement about an axis extending parallel to said nip, one arm of each of said bell crank levers being engaged respectively with said opposite ends of one of said pressure-applying members, spring means engaged with the other arm of each of said bell crank levers for urging the bell crank levers in the direction to press said one of said pressure-applying members toward the other pressure-applying member, said spring means comprising a bow-shaped spring member extending along said pressure-applying members and having an intermediate portion, and spring force control means for controlling the force exerted on said bell crank levers by said spring means, said spring-force control means comprising a control member engaged with said intermediate portion of the bow-shaped spring member and means for selectively securing said control member in a plurality of selected positions in the camera thereby to change the force of the spring member on said arm of each of the bell crank levers.

6. The construction as described in claim 5 wherein the arms of each of the bell crank levers are at an angle of the order of 90° from each other.

7. The construction as described in claim 5 wherein each of said pressure-applying members is a roller.

* * * * *